C. SCHWARTZ.
HEATING SYSTEM.
APPLICATION FILED AUG. 5, 1916.

1,369,711.

Patented Feb. 22, 1921.
5 SHEETS—SHEET 1.

Inventor
Carl Schwartz
By his Attorneys
Keddle Thompson

C. SCHWARTZ.
HEATING SYSTEM.
APPLICATION FILED AUG. 5, 1916.

1,369,711. Patented Feb. 22, 1921.
5 SHEETS—SHEET 3.

Inventor
Carl Schwartz
By his Attorneys
Kiddle Morgan

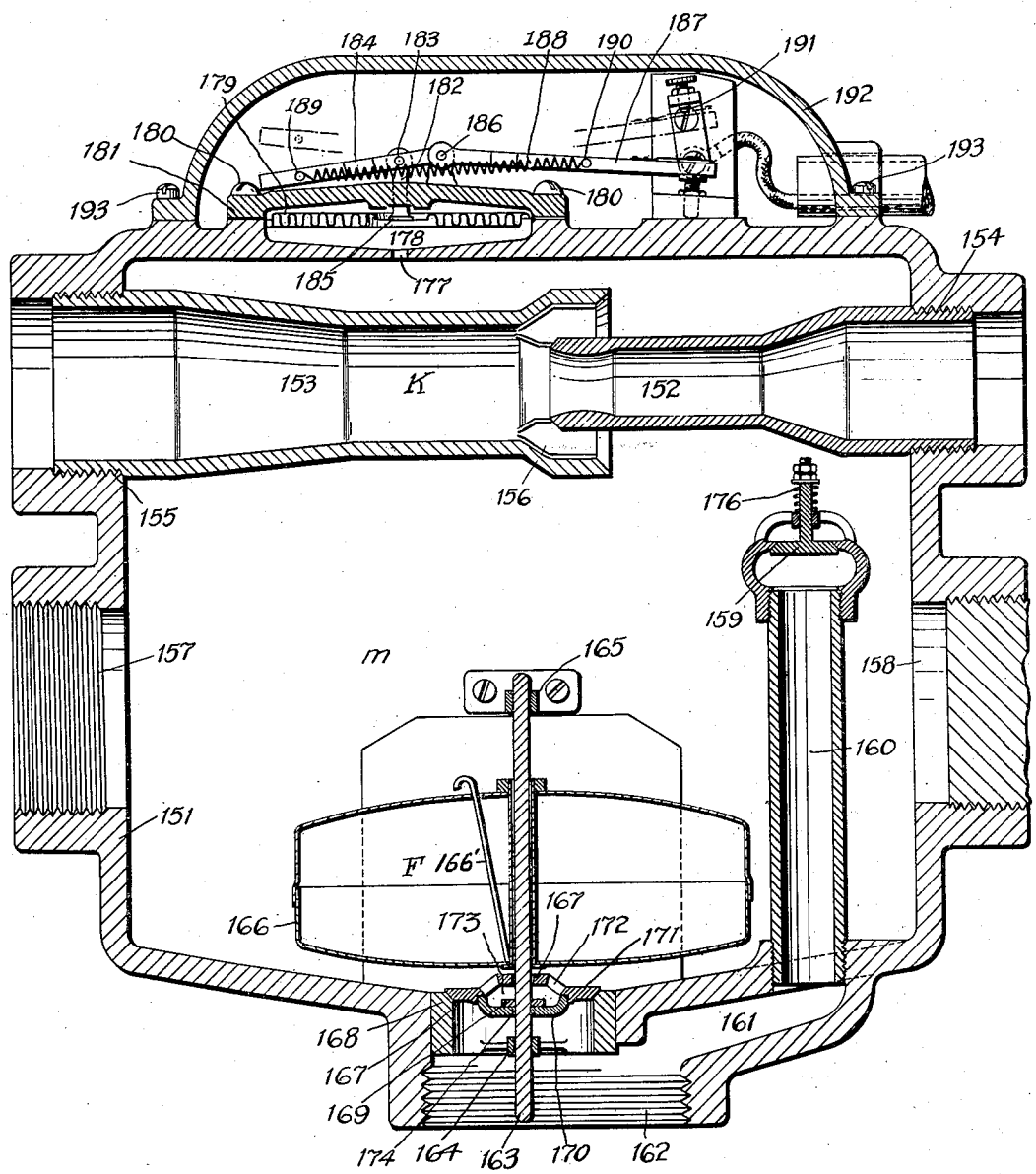

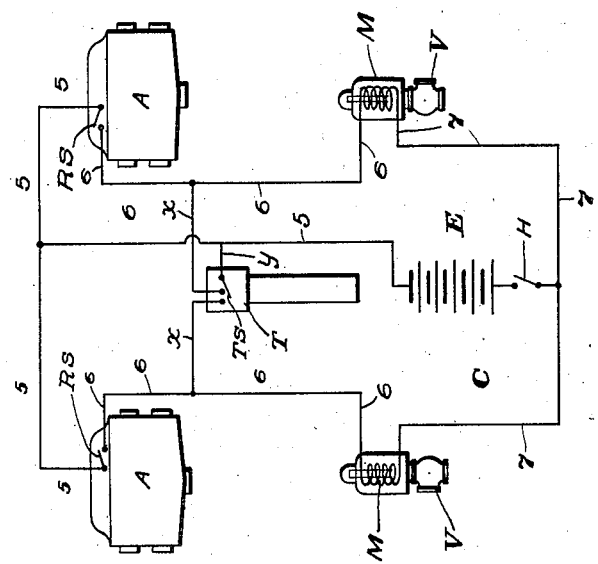
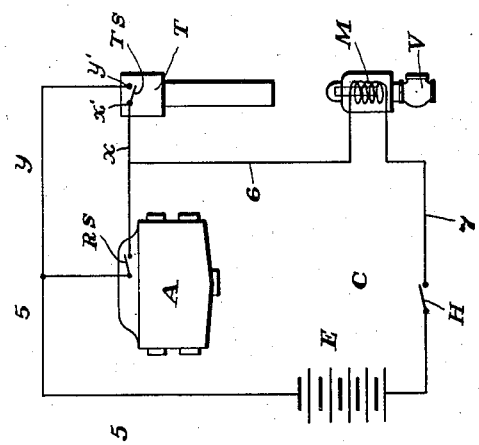

UNITED STATES PATENT OFFICE.

CARL SCHWARTZ, OF NEW ROCHELLE, NEW YORK, ASSIGNOR TO VAPOR CAR HEATING COMPANY, INC., OF NEW YORK, N. Y., A CORPORATION OF NEW YORK.

HEATING SYSTEM.

1,369,711.            Specification of Letters Patent.     Patented Feb. 22, 1921.

Application filed August 5, 1916. Serial No. 113,315.

*To all whom it may concern:*

Be it known that I, CARL SCHWARTZ, a subject of the Emperor of Germany, (who has foresworn his allegiance to said country and has taken an oath declaring his intention of becoming a citizen of the United States,) and a resident of New Rochelle, county of Westchester, and State of New York, have invented certain new and useful Improvements in Heating Systems, (Case B,) of which the following is a specification.

The invention relates to steam heating systems and particularly to systems which are employed for heating cars. The object of the invention is to construct a steam heating system in which the compartment to be heated will be automatically maintained at a comparatively uniform temperature.

The invention also relates to a system in which the steam discharged from the system is above atmospheric pressure and one feature of the invention relates to the employment of the pressure of the steam in the system to regulate the amount of steam that is supplied to the system.

As illustrating the manner in which the invention may be realized, reference is made to the drawings forming a part of this specification, and in which drawings;

Fig. 5 is a vertical sectional view of a regulator which depends for its operation upon the pressure of the steam within the system.

Fig. 6 is a wiring diagram of the valve controlling means of the heating system shown in Fig. 1.

Fig. 7 is a wiring diagram of the valve controlling means of the heating system illustrated in Fig. 2.

As the system shown in Fig. 2 embodies the essential features shown in Fig. 1, the system shown in Fig. 1 will first be briefly described and this will be followed by a detailed description of certain elements or members which are illustrated as being employed in the system shown in Fig. 1, after which a short description of the embodiment of the construction shown in Fig. 2 will be given.

Figure 1:
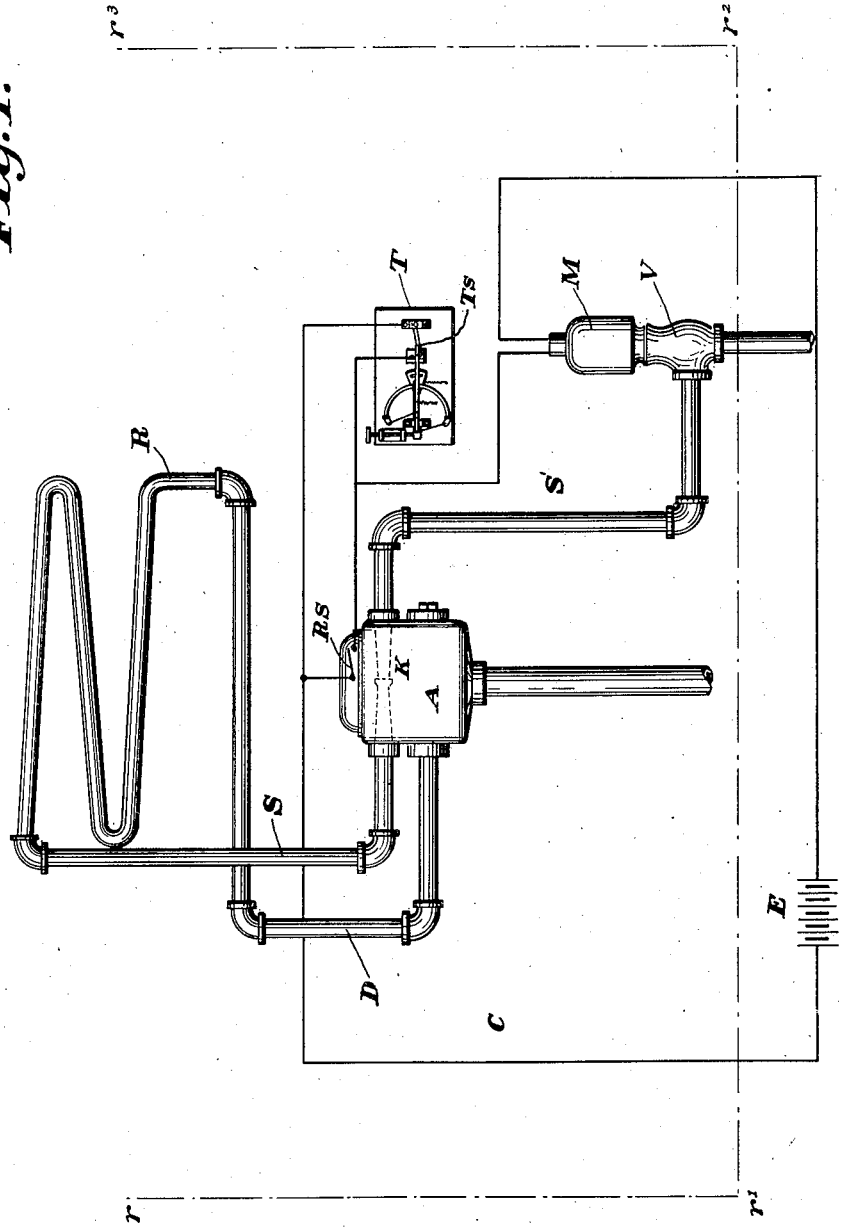
Figure 1 is a diagrammatic view of a compartment provided with the improved heating system.

In Fig. 1 the radiator or heat radiating element is designated by R. Steam is supplied to this radiator from any suitable source of supply as through the branch or supply pipe S. The passageway through this branch or supply pipe is under the control of an electrically operated valve V. The particular form of valve V is a magnetic valve and is closed when the magnet is energized. The magnet just referred to is designated by M. In a portion of the supply pipe there is included an injector K, indicated in dotted lines, in Fig. 1. The function of the injector is to suck steam and vapor that has been discharged from the radiator into the supply pipe and reconduct the steam and vapor thus sucked into the supply pipe, to the radiator by means of the live steam flowing to the radiator. The manner in which this is done will hereinafter more fully appear. The steam from the radiator passes through the return or discharge pipe D and is conveyed thereby to a chamber within the regulator A, in other words, to a chamber from which the injector can suck some of the returned steam whereby it will again be passed through the radiator and thus circulated about the system.

The magnet M of the valve V is included in an electric circuit C and the regulator A is constructed so that it automatically closes a switch and consequently closes the circuit C when the steam pressure within the regulator A exceeds a certain amount.

In the compartment or room indicated by the broken line $r$, $r'$, $r^2$, and $r^3$, in which the radiator R is located, there is also preferably placed a thermostat T, which is constructed so that it can automatically close a switch and thereby close the circuit when the temperature within the room reaches or exceeds a certain degree.

As above indicated, there is hereinafter described the detail of construction of (*a*) the magnetically operated valve V, (*b*) the regulator A, and (*c*) the thermostat T, which is employed in the heating system;

but it will be noted that other forms of valves, other forms of thermostats and other forms of regulators could be employed in the realizing of the invention.

*Magnetically operated valve.*

Figure 3:
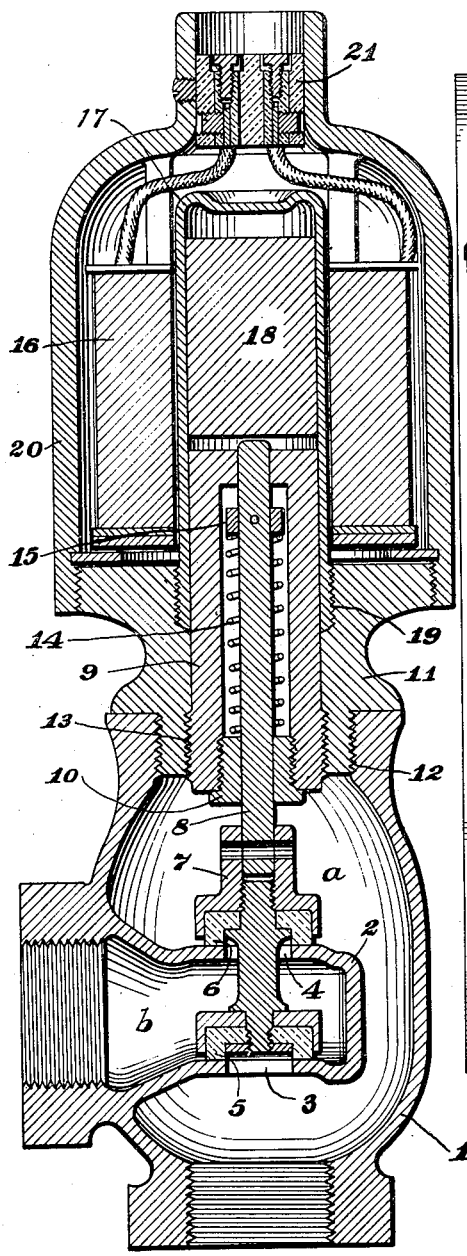
Fig. 3 is a vertical sectional view of a magnetically controlled balanced valve for controlling the flow of steam to the radiator that corresponds to the valve.

A form of magnetically operated valve which can be employed is clearly shown in Fig. 3. This valve comprises a body or casing 1, having therein a partition 2 that divides the valve body into two compartments *a* and *b*. The partition 2 has openings 3 and 4 therein, through which steam can flow when the valve is open, as from the compartment *a* to the compartment *b*.

The partition 2 provides the seats against which the movable valve members 5 and 6 press when the movable valve member 7 is in closed position. This valve member 7 also has a valve stem 8 which extends upwardly through bushings 9 and 10 in which the stem slides.

An annular member 11, which may be considered as the body member of a magnet casing, has a screw connection at 12 with the valve body or casing 1. The bushing 9 has a screw connection at 13 with the magnet body 11, and the bushing 10 is in turn screwed into the bushing 9.

A compression spring 14 surrounds the valve stem 8. One end of this compression spring is seated on the bushing 10, whereas the upper end of the compression spring presses against the ring 15, which is secured to the valve stem 8.

The magnet which actuates the valve is designated by M and it comprises a coil 16 that surrounds a member 17, which is in the form of a cartridge shell. This member 17 is positioned so that its closed end is located at the top or farthest from the valve 7 and its open or lower end is screwed into the annular member or magnet body member 11. If desired, the lower portion of this cartridge-shell-shaped member can be rolled or forced outwardly so as to insure the formation of a steam and water-tight joint between the member 11 and said shell.

Within the shell 17 the core 18 of the magnet is located. From an inspection of Fig. 3 it will be observed that steam or water can pass upwardly along the valve stem 8 and around the core 18, but no steam can enter the space in which the coil 16 of the magnet is located, the steam being prevented from entering this space due to the steam and water-tight joint which is formed at 19. After the coil 16 is in position about the shell, the cover or upper casing member 20 can be screwed into place, thus securely holding the coil 16 in its proper position relative to the magnet base member 11. The upper end of the casing 20 is rendered water-tight by a plug 21, which is suitably constructed for this purpose. This plug 21 is constructed so as to receive the ends of the wires leading to and from the magnet coil 16. It is also constructed so that other wires can be connected to it, whereby electrical energy can be supplied to the magnet. When the magnet is energized, the core 18 is forced downwardly so as to close the valve.

*Thermostats.*

Figure 4:
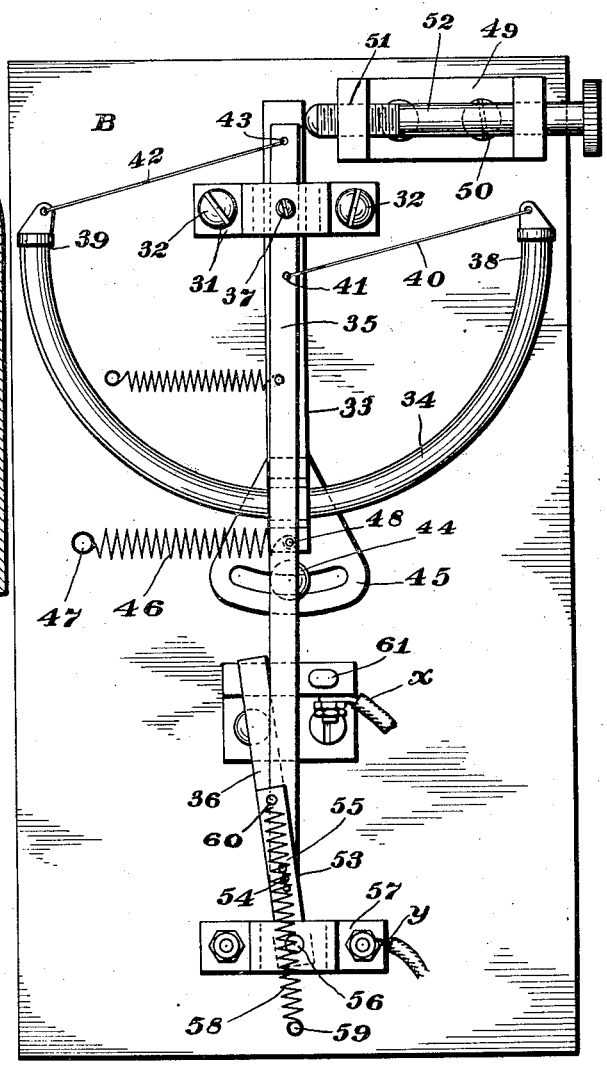
Fig. 4 is a thermostat, which is susceptible to variations in the temperature of the surrounding air, for controlling the opening and closing of a switch.

In Fig. 4 one form of thermostat which can be employed is illustrated. In this figure, B designates a base or frame upon which the thermostat is mounted. To this frame a member 31 is secured as by the screws 32 and this member 31 serves as a fulcrum for an arm 33 carrying a thermostatic element 34 and for a lever 35 which actuates a movable contact 36. The member 33 and the lever 35 are both fulcrumed at 37 on the member 31. The thermostatic member 34 is secured to the lower end of the arm 33. The thermostatic member 34 is in the form of a U-shaped tube having therein a liquid which is susceptible to temperature variations and which will boil or vaporize at a comparatively low temperature. Consequently, when the temperature rises, a pressure will be created within the interior of the tube, thus causing the free ends 38 and 39 thereof to move from each other. A link 40 is connected at one end to the end 38 of the U-shaped tube and at the other end to the lever 35 at the point 41. A link 42 is connected at one end to the end 39 of the U-shaped tube and at the other end to the lever 35 at the point 43. The point 43 is above and the point 41 is below the fulcrum 37. In other words, the links 40 and 42 are connected to the lever 35 upon opposite sides of the fulcrum whereby the outward movements of the ends 38 and 39 will create a couple which tends to force the lower free end of the lever 35 to the right. In order to properly position and adjust the U-shaped member 34 relative to the lever 35, the arm 33 for the U-shaped tube is made so as to constitute an adjustable carrier. This carrier has at the lower end thereof the slotted member 45 that receives the screw 44 for preventing the tube and carrier from moving away from the frame. A spring 46 has one end 47 secured to the base B, and the other end 48 secured to the lower end of the arm or carrier 33. This spring normally tends to force the lower end of the arm or carrier 33 to the left. A member 49 is secured as by means of a screw 50 to the base B, and this member 49 is provided with screw-threaded opening 51, in which an adjusting screw 52 is located. The screw 52 operates in opposition to the spring 46 above referred to to position the U-shaped thermostatic member and to maintain said member in proper position. In other words, the upper end of the arm or carrier 33 is maintained by the spring pressing against the adjusting screw 52 so as to prevent any play or rattle of the carrier.

The lower end of the lever 53 has a point 54 which enters a slotted portion 55 of the movable contact 36. This contact 36 is pivotally mounted at 56 upon a member 57 that is secured to the base B. A spring 58 is secured at 59 to the base B and at 60 to the movable contact member 36. When the parts are in the position shown in Fig. 4, the spring maintains the movable contact in said position, because the center line of pressure, that is, the center line of the spring, is located to the left of the center of the pivotal point 56. When, however, the lower end of the lever 35 moves to the right a sufficient distance, it will cause the upper end of the contact 36 to be swung to the right, and consequently, the upper end of the spring 60 will be swung in the same direction. As soon as the center line of pressure, or the center line of the spring, passes a short distance to the right of the pivoted point 56, the movable contact member 36 will be moved by the spring the rest of its distance to the right; in other words, to a position in engagement with the fixed contact 61. The latter part of the movement of the member 36 into engagement with the stationary contact member 61, will be comparatively quick. When the switch is closed by the movable contact 36, engaging the fixed stationary contact 61, the circuit which comprises the terminals $x$ and $y$ will be completed. The switch which comprises the movable contact or switch member 36 and the fixed contact member 61, is designated as TS and is referred to as the thermostat switch because it is opened and closed by the thermostat.

*The regulator.*

The regulator A indicated in Fig. 1 is shown in cross section in Fig. 5. This regulator comprises a casing 151, providing therein a chamber $m$. Within this casing there is located the injector K which comprises the nozzle member 152 and throat member or receiving member 153. The nozzle member 152 is secured in place in the casing 151 as by means of the screw connection 154, and likewise the throat member 153 is secured to the casing as by means of the screw connection at 155. A spacer or filler is provided at 156 between the delivery end of the nozzle and the receiving end of the throat member so that the nozzle and throat members will always be maintained in the proper position relative to each other. All of the steam which is supplied to the system passes through the nozzle into the throat receiving member, and during this passage it sucks steam or vapor from the chamber $m$ so that the mixture of live steam and of returned steam and vapor is conveyed to the radiator R of the heating system. The steam or vapor which is returned from the radiator enters the chamber $m$ as through the opening 157. When steam is returned to the chamber $m$ through only the opening 157, then the opening at 158 is closed as by means of a pipe plug.

The structure shown in Fig. 5 is intended to be used where the pressure of the steam or vapor within the chamber $m$ is above atmospheric pressure. If the pressure of the steam within the chamber $m$ rises to an abnormally high pressure, steam can escape through a relief valve 159, the pipe 160, the passageway 161, and the opening 162, to the atmosphere or to the interior of a pipe leading to the atmosphere. With the steam or vapor which is returned to the chamber $m$ there is of course some condensed steam or vapor, and provision must be made for the escape of the condensed steam or vapor after it has accumulated to a certain height within the chamber $m$. The escape of this condensed steam or vapor is controlled by means of the float valve construction F.

The float valve construction comprises a vertically extending rod 163, which is slidable in guideway members 164 and 165 that are on or secured to the casing. This rod has secured to it a float 166, which is raised and lowered with the rise and fall of the water of condensation that is within the chamber $m$. This float has a tube 166' that insures an equalization of steam pressure on the interior and exterior of the float.

A main valve 167 normally rests against a seat 168 which is carried by the casing. This main valve surrounds the vertically extending rod 163, but the rod is free to move vertically a limited distance relative to this valve.

A pilot valve 169 is secured to the rod 163 and the pilot valve normally rests against the member 170 of the main valve, which member 170 provides a seat for the pilot valve 169. The main valve in fact comprises the member 170 and the member 171, the latter of which is provided with the openings or passageways 172.

A small chamber 173 is provided between the members 170 and 171 of the main valve, and the water of condensation passes through the opening 172 to the chamber 173 and thence when the pilot valve 169 is raised, through the comparatively small passageway 174 that is between the rod 163 and the member 170 of the main valve. It will therefore be seen that when the float F is raised only a limited distance that the water of condensation can flow from the chamber $m$ only through the openings 172 into the chamber 173 and thence past the pilot valve. When, however, the float and rod 163 are raised a sufficient distance whereby the pilot valve 169 engages the under side of the valve member 171, a further upward movement of the pilot valve will effect a raising of the main valve 167, and consequently, the water of condensation can flow not only past the pilot valve but also through the opening between the main valve member 167 and its seat 168. As the water of condensation within the chamber $m$ falls to a certain lower level, the float F will be successively positioned whereby the main valve will first close and finally the pilot valve, thus maintaining the pressure within the chamber $m$.

It will here be remarked that the relief valve 159 is maintained in place by a spring 176 that is of sufficient strength to maintain the relief valve closed at normal working pressures.

The casing 151 is provided with an opening 177, which permits steam to flow to a chamber 178. The roof or upper portion of this chamber is defined as by the yielding diaphragm 179 that is clamped in place by screws 180, which pass through a cover member 181 into the casing 151. A steam-tight joint is of course provided between the casing 181 and the outer edges of this yielding diaphragm 179. A rod 182 passes through the cover and is pivotally connected at its upper end 183 to a lever 184. The lower end 185 of the rod is connected to the diaphragm 179. When the pressure within the chamber $m$ is normal, the parts occupy the full line position shown in Fig. 5. When, however, the pressure within the chamber $m$ exceeds a certain predetermined amount, the central portion of the diaphragm 179 is raised, thus causing the lever 184 to be raised to the dotted position indicated in this figure. It will be noted that the central portion of the diaphragm 179 may be said to be a portion which is under the direct influence of the steam within the discharge end of the heating system and that said central portion of the diaphragm is therefore dependent for its position upon a function of the steam, to wit, the pressure of the steam. The lever 184 is fulcrumed at 186 on a member carried by the cover 181, and a movable contact 187 is also fulcrumed at this same place.

A spring 188 is connected at 189 to the lever 184 and at the point 190 to the movable contact 187. When the lever and movable contact are in the full line position shown in Fig. 5, this spring normally maintains the movable contact in the full line position shown because the center line of pressure, or the center line of the spring, is located below the center of the pivotal 186. When, however, the lever 184 is raised to its dotted position, the center line of pressure, or the center line of the spring, is raised above the pivotal point 186, and when the center line of the spring passes this pivotal point, the spring will effect a quick movement of the movable contact member from the full line position to its dotted position. In other words, the spring will effect a quick closing of the switch, which includes the movable contact member 187. When in the dotted position, the movable contact member engages a fixed contact 191 and thus effects a closing of the switch. The switch which comprises the movable contact member 187 and the fixed contact member 191, is designated as RS and is referred to as the regulator switch because it is controlled by the regulator. The regulator switch is in fact a switch that is operatively associated with the movable portion of the diaphragm or, in other words, with the movable portion or member that is under the direct influence of the heating medium within the heating system.

From an inspection of this figure it will be manifest that the parts of the switch RS can all be located in a closed chamber which is provided within the casing member 192 that is secured in place on the main casing member 151 by means of the screws 193.

*Wiring diagram and method of operation.*

For the sake of convenience, the switch which is opened and closed by the regulator, has been designated as the regulator switch RS, and the switch which is controlled by the thermostat shown in Fig. 4 has been referred to as the thermostat switch TS. The wiring diagram of the construction shown in Fig. 1 appears in Fig. 6. In both Figs. 1 and 6, the source of electrical supply, is indicated by E and this supplies current to the circuit C.

The circuit C comprises a conductor 5, which extends from the source E of electrical supply to one of the switch members of the regulator switch RS, a conductor 6 which extends from the other switch member of the regulator switch to one end or terminal of the coil of the magnet M, and a conductor 7 which extends from the other end or terminal of the coil of the magnet M back to the source of supply E. In the conductor 7 a hand switch H is located. From one of the switch members or contacts of the thermostat switch TS, a conductor $x$ extends to the conductor 6, and from the other switch member or contact of the thermostat switch, the conductor $y$ extends to the line or wire 5.

When the system is in operation, the hand switch H is closed and steam is passing to the radiator when the valve V is open. This valve V is open at all times except when the magnet M thereof is energized. The magnet M is energized when the pressure within the regulator R is at or above a definite amount whereby the switch RS is closed. If the temperature within the room is at or above a certain definite degree, the switch TS is closed by the thermostat and this completes the circuit C whereby the magnet M is energized.

As will be manifest from the diagram in Fig. 6, the switch TS can complete the circuit C even though the switch RS is open, and the switch RS can complete the circuit even though the switch TS is open.

From what has preceded, it will be manifest, when the valve V is open, live steam is supplied through the pipe S, passes through the injector K, and sucks with it some of the returned steam or vapor that is within the chamber of the regulator A. The mixture of live steam and returned steam or vapor is conveyed to the radiator R and finally passes from the radiator R through the discharge pipe D into the chamber of the regulator A. This continues until the room or compartment within which the radiator is located has reached a certain temperature, or until the pressure of steam within the system reaches a certain pressure. If the temperature of the room reaches a certain degree, the thermostat T therein will cause a closing of the switch TS and thus the circuit C will be completed, causing an energizing of the magnet M and a corresponding closing of the valve V. On the other hand, should the pressure within the heating system reach a certain amount, the switch RS will be automatically closed, thus completing the circuit C, causing an energizing of the magnet M and a closing of the valve V. The water of condensation is allowed to escape from the system, that is, from the chamber within the regulator A due to the float construction F heretofore described.

Figure 2:
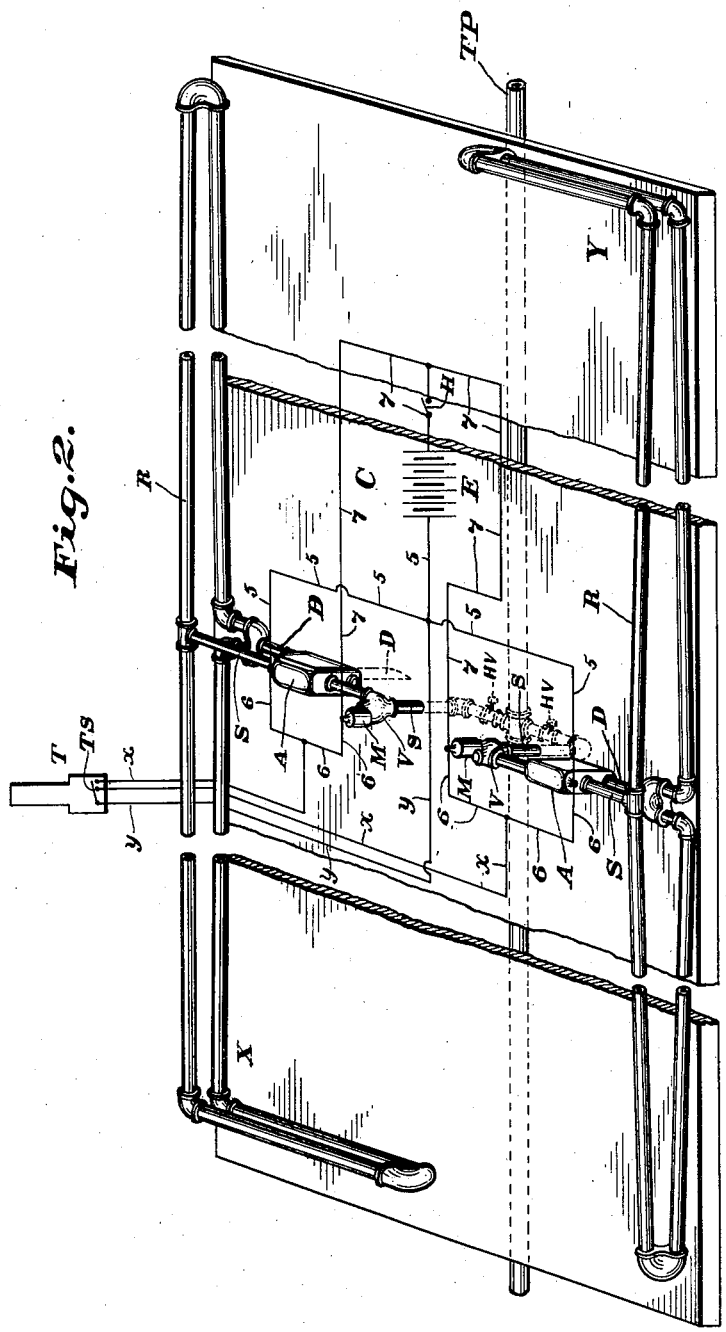
Fig. 2 is a perspective view of a heating system embodying the features of construction shown in Fig. 1 and adapted to the car, the body of which is indicated in said figure.

In Fig. 2 there is illustrated an application of two of the heating systems shown in Fig. 1 to a car. This car has the usual train pipe TP and the branches S for supplying steam to the radiators R. It is well known that in commercial practice the pressure of the steam in the train pipe varies and that the pressure of the steam therein may be relatively high. It is also well known that in practice the pressure of the steam in the train pipe of the coaches or cars at the head of the train is considerably higher than that of the coaches or cars at the rear of the train, and an ideal system should be adaptable to effect the same heating results in the different coaches or cars, even though the pressure along the train pipe varies. Hand valves HV are also located in these branches, or radiator supply pipes, at a point between the train pipe and the electrically controlled valves V, whereby the steam to the radiators can be shut off by hand should occasion require. In the car, however, only one thermostat is illustrated as being within the car compartment. In said Fig. 2 the systems are designated by X and Y, and together they may be considered to constitute a duplex system. In this figure, as in Fig. 1, the radiators are designated by R, the thermostats by T, the controlling valves by V, the magnets for controlling the valves by M, and the regulators by A. The manner in which the several parts or elements are connected up is clearly indicated.

It will be seen from comparison of Figs. 1 and 2 that the several parts are connected and operated in substantially the same manner as the system heretofore described in connection with Fig. 1.

The wiring diagram, Fig. 7, shows clearly the manner in which a single thermostat can be employed in connection with the rest of the operative elements of the system shown in Fig. 2. In Fig. 7 and also in Fig. 2 the hand switch which is closed when the system is to be operated, is designated by H, and the source of electrical energy by E. In fact, all of the parts indicated in this figure are substantially the same as the parts indicated in Fig. 6 and have been given the same reference characters. It is therefore believed further description thereof at this time is unnecessary.

From what has preceded, it will be evident that when the pressure of the steam in either the system X or the system Y reaches a certain pressure, the regulator of that particular system will cause a closing of its corresponding valve V and a shutting off of the steam from that particular system. If, however, the temperature within the car reaches a certain predetermined degree, the thermostat T will automatically close the thermostat switch TS, thus shutting off the supply of steam to both the systems X and Y.

It will be evident, however, should it be desired to have two thermostats in the car, one for the system X and one for the system Y, this could be readily done. It will also be manifest that other forms of electrically controlled valves, other forms of thermostats, and other forms of regulators than those shown and described, can be employed in the heating system and that the invention can be embodied in various forms and modifications without departing from the spirit and scope thereof.

What is claimed is:

1. A steam heating system of the class described comprising in combination a radiator, a supply pipe leading to said radiator from a source of live steam supply, a regulator, a pipe leading from the delivery end of said radiator to said regulator, said supply pipe comprising as a part thereof an injector which is arranged so as to suck steam or vapor returned to the regulator, and convey said returned steam or vapor when mixed with the incoming live steam or vapor to the radiator, said regulator having a float valve for permitting the escape of water of condensation while a pressure greater than atmospheric pressure is maintained within the regulator, a switch operating member which is dependent for its operation upon the pressure of the steam within the regulator, a regulator switch controlled by said switch operating member, an electrically controlled valve located in said supply pipe between the source of steam supply and said injector and an electric circuit which can be completed by the closing of said regulator switch whereby, when the circuit is completed, the electrically operated valve will shut off the supply of live steam.

2. A heating system, said system comprising in combination a supply pipe, a radiator, a regulator, a supply pipe member leading from the said supply pipe to the regulator and terminating in a nozzle, a supply pipe member leading from the regulator to the radiator and having at the inlet end thereof a throat arranged to receive live steam from the nozzle whereby steam or vapor in the regulator can be sucked into and mixed with the live steam flowing to the radiator, a magnetically controlled valve located so as to open and close the passageway in the supply pipe member which leads from the said supply pipe to the regulator, a pipe leading from the discharge end of the radiator to the regulator, means for permitting the escape of water of condensation from the system, an electric circuit which includes the magnet of said magnetically operated valve, and a regulator switch, said regulator switch comprising as a part thereof a movable member which is dependent for its operation upon the pressure of the steam within the regulator, the construction being such that when the switch is closed said circuit will be completed to energize the magnet and close the valve.

3. A duplex heating system comprising in combination with a pipe for conveying a heating medium, a pair of radiators, a pair of supply pipes one of which leads from the pipe first mentioned to one of said radiators and the other of which leads from the pipe first mentioned to the other of said radiators, a pair of electromagnetically controlled valves each controlling a supply pipe, a regulator for each radiator, a discharge pipe for each regulator for conducting the heating medium from its corresponding radiator to its corresponding regulator, a switch for each regulator and automatically operated thereby, a source of electric current, an electric circuit including said source of electric current, one of said electromagnetically controlled valves and one of said regulator switches, another electric circuit including said source of electric current, the other of said electromagnetically controlled valves and the other regulator switch, a thermostatic switch operatively connected to said source of electric current and to said electromagnetically controlled valves, each of said regulator switches being operable independently of the other to control the electromagnetically controlled valve with each switch is in circuit, and the thermostatic switch being operable to control both of said valves.

4. A steam heating system comprising in combination a radiator, a magnetic valve for controlling the flow of steam to said radiator, a regulator that receives steam from said radiator, a thermostat, a switch operated by said thermostat, and a regulator switch that is under the control of the pressure of the steam within said regulator, said switch operated by said thermostat and said regulator switch each being operable to close a circuit to the magnet of said magnetic valve.

5. In a heating apparatus, the combination with a pipe adapted to contain steam at relatively high pressures, of a radiator located in a compartment to be heated, said radiator communicating with said pipe, a controlling valve arranged between the said pipe and radiator for controlling the flow from the former to the latter, a movable member disposed so as to be directly influenced by the pressure in said radiator, a thermostat directly influenced by temperature changes outside of said radiator, and a motor adapted to be actuated by said movable member and by said thermostat independently of each other, which motor when actuated moves said controlling valve the full limit of its range of movement, in either direction.

6. In a heating apparatus, the combination with a pipe adapted to contain steam at relatively high pressures, of a radiator located in a compartment to be heated, said radiator communicating with said pipe and having an outlet open to the atmosphere, a controlling valve arranged between said pipe and radiator for controlling the flow of steam from the former to the latter, a spring which tends to hold said valve in its open position, a movable member arranged to be directly influenced by pressure conditions in said radiator, a thermostat adapted to be directly influenced by temperature conditions outside of said radiator, and mechanism actuated by the movement of either said movable member or said thermostat for closing said controlling valve against said spring.

7. In a heating apparatus, the combination with a pipe adapted to contain steam at relatively high pressures, of a radiator located in a compartment to be heated, said radiator communicating with said pipe and having an outlet open to the atmosphere, a controlling valve arranged between said pipe and radiator for controlling the flow of steam from the former to the latter, a spring which tends to hold said valve in its open position, a thermostat in said compartment directly influenced by the changes of temperature of the atmosphere therein, a movable member arranged to be directly influenced by pressure conditions of the medium in said radiator, an electro-magnetic device for closing said controlling valve against said spring, and switch devices adapted to be closed by the movement of said movable member and by the expansion of said thermostat respectively, said switch devices being arranged in independent circuits, each of which is in series with the said electro-magnetic device.

This specification signed and witnessed this 3rd day of August, A. D. 1916.

CARL SCHWARTZ.

Signed in the presence of—
EDWIN A. PACKARD,
G. McGRANN.